United States Patent

Iijima et al.

[11] Patent Number: 5,942,983
[45] Date of Patent: Aug. 24, 1999

[54] ASSURING DATA READ/WRITE OPERATION IN AN ELECTRONIC APPLIANCE

[75] Inventors: Yuko Iijima; Hisato Shima, both of Kanagawa; Harumi Kawamura; Makoto Sato, both of Tokyo, all of Japan

[73] Assignee: Sony Corporation, Tokyo, Japan

[21] Appl. No.: 08/759,457

[22] Filed: Dec. 5, 1996

[30] Foreign Application Priority Data

Dec. 7, 1995 [JP] Japan ...................................... 7-345333

[51] Int. Cl.⁶ ....................................................... H04Q 3/00
[52] U.S. Cl. ................................ 340/825.06; 340/825.24; 340/825.5; 340/825.15; 395/567; 395/306; 370/257
[58] Field of Search .......................... 340/825.06, 825.22, 340/825.24, 825.25, 825.52, 825.5, 825.07, 825.15; 348/5; 395/567, 306, 287; 370/462, 257; 711/211; 705/9

[56] References Cited

U.S. PATENT DOCUMENTS

| | | | |
|---|---|---|---|
| 5,001,473 | 3/1991 | Ritter et al. | 340/825.52 |
| 5,402,115 | 3/1995 | Tanaka | 340/825.24 X |
| 5,444,847 | 8/1995 | Iitsuka | 395/287 |
| 5,457,446 | 10/1995 | Yamamoto | 340/825.24 |
| 5,499,018 | 3/1996 | Welmer | 340/825.07 |
| 5,579,496 | 11/1996 | Van Steenbrugge | 340/825.22 X |
| 5,621,901 | 4/1997 | Morriss et al. | 395/306 |
| 5,689,244 | 11/1997 | Iijima et al. | 340/825.07 |
| 5,712,834 | 1/1998 | Nagano et al. | 340/825.24 X |

*Primary Examiner*—Brian Zimmerman
*Assistant Examiner*—William H. Wilson, Jr.
*Attorney, Agent, or Firm*—Frommer Lawrence & Haug, LLP.; William S. Frommer

[57] ABSTRACT

In a communication system, when data is read/written from/into a memory contained in a recording medium employed in one electronic appliance by another electronic appliance via a communication control bus such as the IEEE-1394 serial bus, the data read/write operations can be assured. At least one electronic appliance manages the below-mentioned items (1) to (5) when at least one electronic appliance receives commands transmitted when another electronic appliance executes data read/write operations to the storage element; (1) a first electronic appliance is brought into an open state by accepting an open command while being under a close condition; (2) a first electronic appliance is maintained in a close state by accepting a close command while being under a close condition; (3) a,first electronic appliance memorizes the identity of a second electronic appliance which has transmitted an open command when in an open condition; (4) when a first electronic appliance accepts a read/write open command from a third electronic appliance other than the memorized second electronic appliance under a read open condition, the first electronic appliance forcibly closes the read open condition; and (5) when a first electronic appliance receives one of a read open command and a read/write open command from a third electronic appliance other than the memorized second electronic appliance under read/write open condition, the first electronic appliance returns a reject response to the third electronic appliance issuing the read/write open command.

12 Claims, 5 Drawing Sheets

CPS : CYCLE START PACKET
Iso : Iso DATA PACKET
Async : ASYNC DATA PACKET

TO OTHER APPLIANCES

FIG. 7

| EVENT \ STATUS | READ OPEN | READ/WRITE OPEN |
|---|---|---|
| ACCEPT READ OPEN COMMAND. | REJECT RESPONSE OR ACCEPT RESPONSE. | REJECT RESPONSE |
| ACCEPT READ/WRITE OPEN COMMAND. | ACCEPT RESPONSE. FORCIBLE CLOSE. | REJECT RESPONSE |
| READ OPEN BY OPERATING MAIN BODY. | EXECUTE MAIN BODY OPERATION. CONTINUE READ OPEN, OR FORCIBLE CLOSE. | NEGLECT MAIN BODY OPERATION, AND DISPLAY THIS NEGLECT. |
| READ/WRITE OPEN BY OPERATING MAIN BODY. | EXECUTE MAIN BODY OPERATION. FORCIBLE CLOSE. | NEGLECT MAIN BODY OPERATION, AND DISPLAY THIS NEGLECT. EXECUTE MAIN BODY OPERATION AFTER CLOSED. |

FIG. 8

| EVENT \ STATUS | READ OPEN | READ/WRITE OPEN |
|---|---|---|
| BUS RESET OCCURS. | FORCIBLE CLOSE. | FORCIBLE CLOSE. |
| TIME OUT OCCURS. | AFTER ACCEPTING OPEN COMMAND FROM ANOTHER APPLIANCE, ACCEPT RESPONSE. FORCIBLE CLOSE. | AFTER ACCEPTING OPEN COMMAND FROM ANOTHER APPLIANCE, ACCEPT RESPONSE. FORCIBLE CLOSE. |
| ACCEPT COMMAND FOR INFLUENCING MIC DATA FROM ANOTHER APPLIANCE. | REJECT RESPONSE. OTHERWISE EXECUTE COMMAND AND FORCIBLE CLOSE. | REJECT RESPONSE. |
| INPUT MAIN BODY OPERATION FOR INFLUENCING MIC DATA. | EXECUTE MAIN BODY OPERATION. FORCIBLE CLOSE. | NEGLECT MAIN BODY OPERATION, AND DISPLAY THIS NEGLECT. AFTER CLOSED, EXECUTE MAIN BODY OPERATION. |

ASSURING DATA READ/WRITE OPERATION IN AN ELECTRONIC APPLIANCE

BACKGROUND OF THE INVENTION

The present invention generally relates to a communication system for establishing communications among a plurality of electronic appliances connected to each other via a communication control bus such as a serial bus standardized by, for instance, IEEE-1394 (will be referred to as an "IEEE1394 serial bus" hereinafter) capable of transmitting control signals and information signals in a mixed form. More specifically, the present invention is directed to a technique capable of assuring data read/write operations when data is read/written from/into a memory contained in a recording medium employed in one electronic appliance by another electronic appliance via the communication control bus.

Various communication systems have been proposed in the field, in which a plurality of electronic appliances are connected to each other via a communication control bus such as the IEEE1394 serial bus capable of transmitting control signals and information signals in the mixed manner, and the control signals and the information signals are communicated among these electronic appliances.

In FIG. 1, there is shown an example of such a communication system. This communication system is equipped with a first video tape recorder (will be referred to as a "VTR" hereinafter) 11, a second video tape recorder (VTR) 12, and a first camera-built-in type VTR (will be referred to as a "CAM" hereinafter) 13. Then, the first VTR 11 is connected to the second VTR 12 via a twisted pair cable 14, and the first VTR 11 is connected to the first CAM 13 via another twisted pair cable 15. These twisted pair cables 14 and 15 constitute the IEEE1394 serial bus.

As represented in FIG. 2, the signal transmissions among these plural electronic appliances are carried out by way of the time divisional multiplexing system in a preselected communication cycle (for instance 125 μsec) in this communication system. The signal transmission is commenced in such a manner that an electronic appliance called as a "cycle master" sends out a cycle start packet indicative of the starting time of the communication cycle via the bus. It should be noted that a "cycle master" is automatically determined based on the procedure ruled in IEEE-1394 when the respective electronic appliances are connected to each other via an IEEE1394 serial bus cable.

There are two communication modes within 1 communication cycle, namely an $I_{SO}$ communication mode and an Async communication mode. In the $I_{SO}$ communication mode, an information signal such as video data and audio data is transmitted in an isochronous manner. In the Async communication mode, a control signal such as a connection control command is transmitted in an asynchronous manner. Then, an $I_{so}$ packet is transmitted prior to an Async packet. A plurality of $I_{so}$ data are discriminatable from each other by attaching channel numbers 1, 2, 3, . . . , N to the respective $I_{so}$ packets. A time period defined after a transmission of an $I_{so}$ packet is accomplished and until the next cycle start packet appears is used to transmit an Async packet.

When a video signal and an audio signal (will be referred to as an "audio/video signal" hereinafter) recorded on a video tape cassette are dubbing-processed via an IEEE1394 serial bus in the above-described communication system, the following case will now be considered. That is, as illustrated in FIG. 3, an audio/video signal recorded on a video tape cassette 21 loaded on the first CAM 13 is dubbing-processed to a video tape cassette 23 loaded on the first VTR 1.

In this case, a memory 22 and a memory 24 are assembled into package of these video tape cassettes 21 and 23 respectively. A memory assembled in package of a video tape cassette will be referred to an "MIC (Memory In Cassette)" hereinafter. The content information (data, title etc) of the audio/video signals recorded on the video tape cassettes 21 and 23 are readable/writable from/in these MICs 22 and 24.

It is assumed that when the audio/video signal recorded on the video tape cassette 21 is dubbing-processed to the video tape cassette 23, the content information stored in the MIC 22 is written into the MIC 24. At this time, the audio/video signal is transmitted via the bus as $I_{so}$ data shown in FIG. 2. On the other hand, the content information of the MIC 22 is transmitted via the bus as Async data.

Now, as represented in FIG. 4, in such a case that while the first VTR 11 reads therein the data stored in the MIC 22 by subdividing this data, the second VTR 12 rewrites the data (for instance, title) stored in the MIC 21, there is a certain possibility that the data which has been read before this title is rewritten can no longer constitute the correct information.

SUMMARY OF THE INVENTION

The present invention has been made to solve the above-explained problems, and therefore, has an object to provide an electronic appliance, and a method for managing electronic appliances, by that while a permission for reading/writing data is given, an electronic appliance which has accepted such a permission is always capable of reading/writing this data as a correct value.

To achieve the above-described object, an electronic appliance managing method, according to an aspect of the present invention, is featured by being used in a communication system for establishing communications among a plurality of electronic appliances connected to each other via a communication control bus capable of transmitting a control signal and an information signal in a mixed manner, in order to manage data read/write operations with respect to a storage element built in a recording medium employed in one of said plural electronic appliances, wherein: when various sorts of commands are received which are transmitted when other electronic appliances employed in said communication system perform data read/write operations to said storage element, the below-mentioned items (1) to (5) are managed:

(1) said first-mentioned electronic appliance is brought into an open state by accepting an open command while being under close condition;

(2) said first-mentioned electronic appliance is brought into a close state by accepting a close command while being under close condition;

(3) while said first-mentioned electronic appliance is under open condition, said first-mentioned electronic appliance memorizes a counter electronic appliance which has transmitted an open command;

(4) when said first-mentioned electronic appliance accepts a read/write open command from another electronic appliance other than said memorized counter electronic appliance under read open condition, the said first-mentioned electronic appliance forcibly closes the read open condition; and (5) when said first-mentioned electronic appliance accepts one of a read open command and a read/write open command from another electronic appliance other than said memorized counter electronic appliance under read/write open condition, said first-mentioned electronic appliance returns a reject response to said electronic appliance for issuing said read/write open command.

In the electronic appliance managing method according to another aspect of the present invention, the following items (6) to (8) may be managed in addition to the above-explained management items (1) to (5):

(6) when resetting operation of the communication control bus happens to occur under open condition, or when a main body of the electronic appliance is manipulated which may give influences to the data stored in the storage element, the open condition of said electronic appliance is forcibly brought into a close condition.

(7) when resetting operation of the communication control bus happens to occur while writing data into the storage element, the state of the electronic appliance is forcibly brought into a close state, and also said electronic appliance which has written the data into the storage element is brought into an open state with a top priority during a predetermined time period after the resetting operation.

(8) a time definition is made in the open state (for example, a time out time period is reset when being under open state, and when being accessed to the storage element).

An electronic appliance, according to a further aspect of the present invention, is featured by such an electronic appliance used in a communication system for establishing communications among a plurality of electronic appliances connected to each other via a communication control bus capable of transmitting a control signal and an information signal in a mixed manner, wherein:

a recording medium capable of recording therein said information signal and containing a storage element for storing content information of said information signal is constituted with being useable, and said electronic appliance is comprised of a means for managing the above-described items (1) to (5) when one electronic appliance receives various sorts of commands transmitted when another electronic appliance employed in said communication system executes data read/write operations to said storage element.

BRIEF DESCRIPTION OF THE DRAWINGS

For a better understanding of the present invention, reference is made of a detailed description to be read in conjunction with the accompanying drawings, in which:

FIG. 7 explanatorily describes process operations when an open command is accepted in the electronic appliance of FIG. 5; and FIG. 8 explanatorily describes process operations when an emergency measure is taken in the electronic appliance of FIG. 5.

DETAILED DESCRIPTION OF THE PREFERRED EMBODIMENTS

Figure 1:
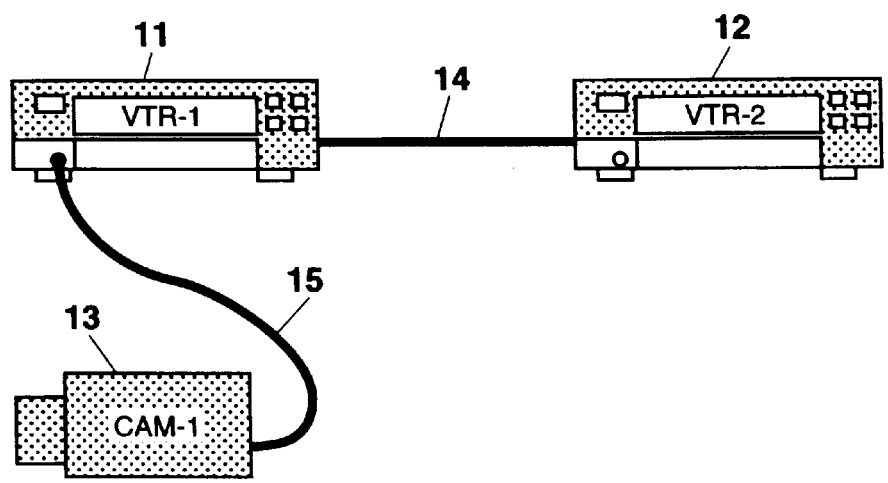
FIG. 1 schematically shows one example of the communication system with employment of the IEEE1394 serial bus.
Figure 2:
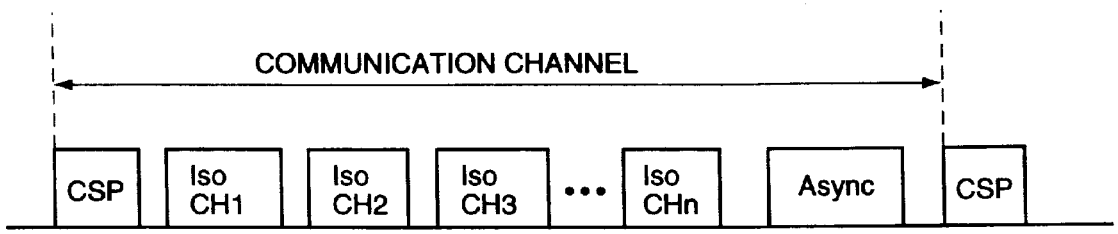
FIG. 2 schematically represents one example of the data structure on the bus in the communication system with employment of the IEEE1394 serial bus.
Figure 3:
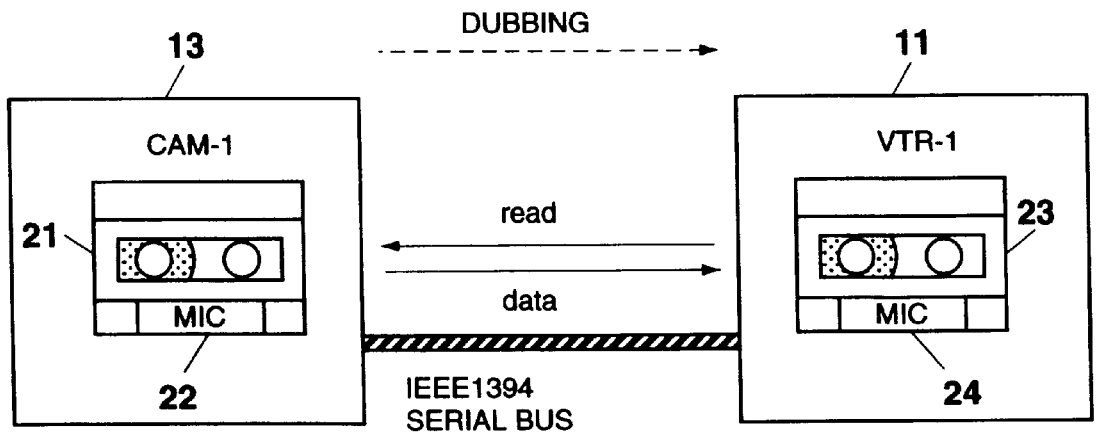
FIG. 3 explanatorily shows an access operation to MICs assembled in video tape cassettes.
Figure 4:
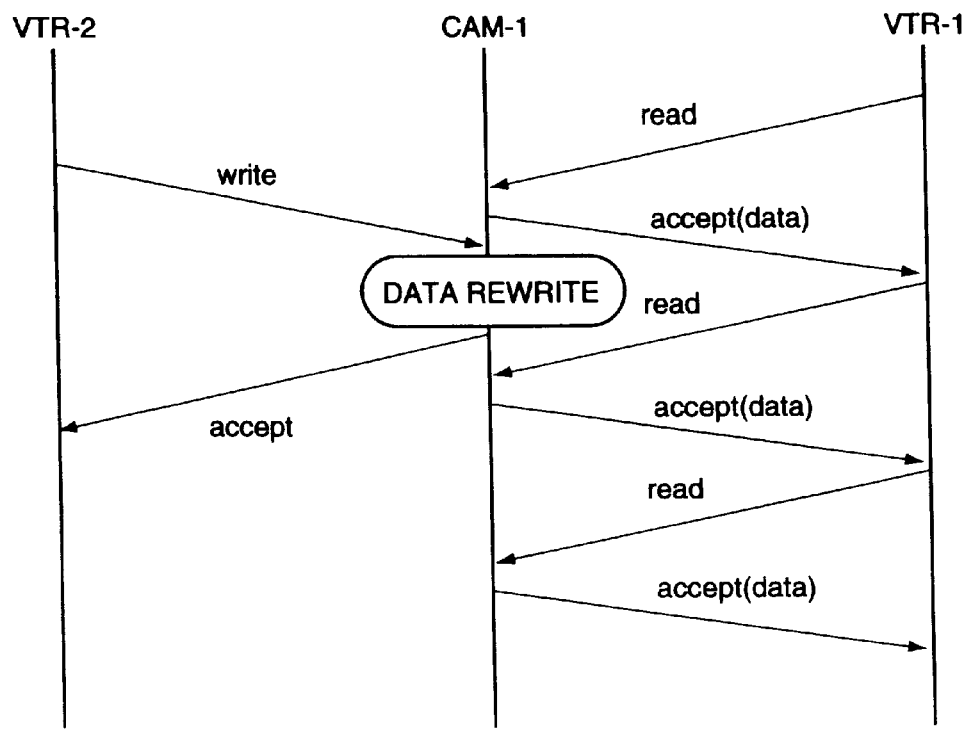
FIG. 4 is a schematic diagram for explaining data read/write timing to the MICs of FIG. 3.

Referring now to drawings, various preferred embodiments of the present invention will be described in detail. The following description is made based on such a fact that the inventive idea of the present invention is applied to the communication system indicated in FIG. 1.

Figure 5:
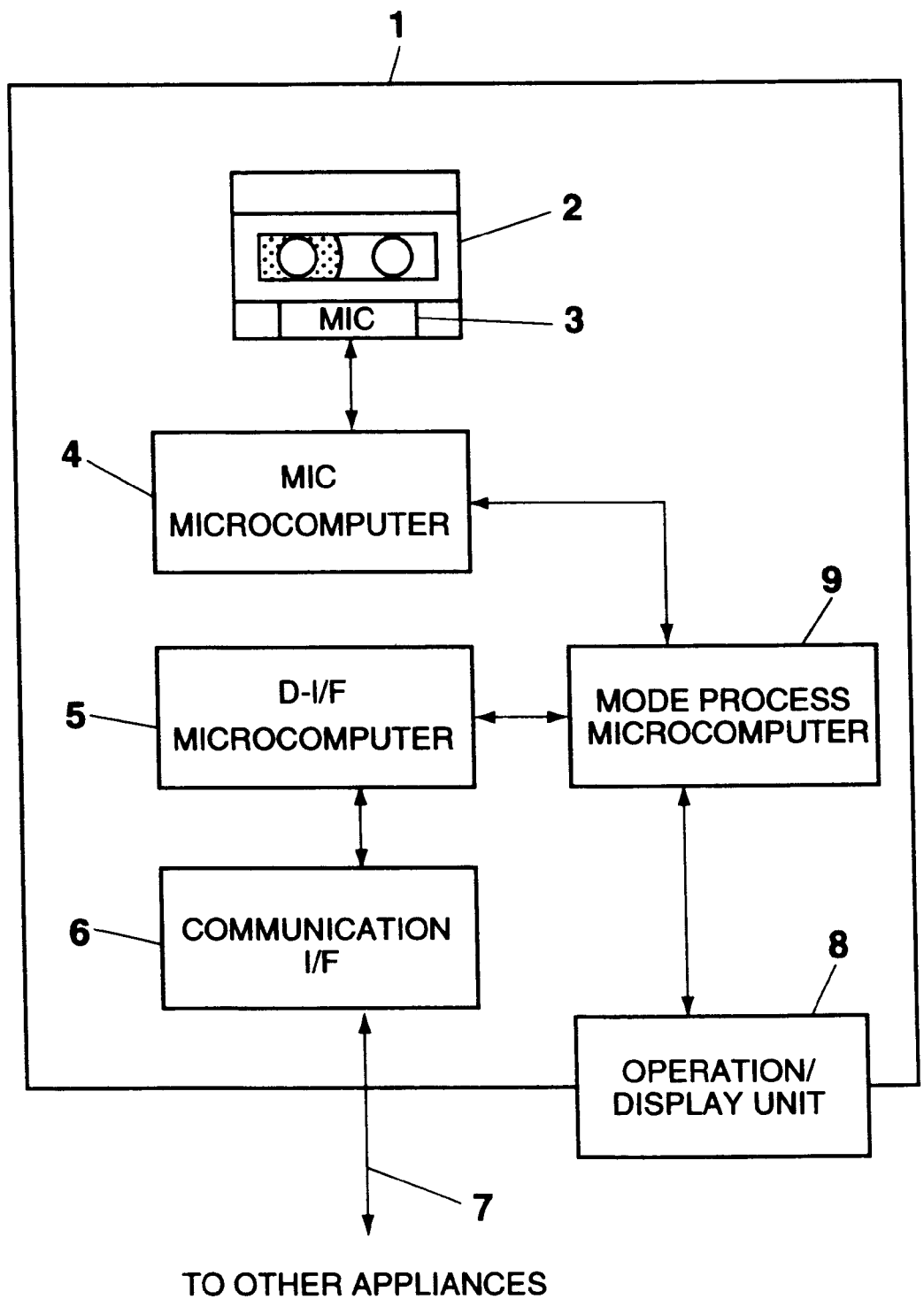
FIG. 5 is a schematic block diagram for indicating a major arrangement of an electronic appliance according to the present invention.

FIG. 5 is a schematic block diagram for indicating a major arrangement of an electronic appliance according to the present invention. As shown in this drawing, the electronic appliance 1 according to the present invention is arranged by a video tape cassette 2 having an MIC 3, an MIC microcomputer 4 for reading/writing data with respect to the MIC 3, and a digital interface microcomputer 5 for executing a process operation of an application layer, for instance, various sorts of commands and of responses are produced. This electronic appliance 1 is further constructed of a communication interface 6 for executing process operations of a link layer and a physical layer, for example, a packet is produced/detected, and data is encoded/decoded.

In addition, this electronic appliance 1 is constituted by an operation/display unit 8 corresponding to a user interface, and a mode process microcomputer 9 for controlling the MIC microcomputer 4 and the digital interface microcomputer 5 so as to detect operation modes and the like entered from the operation/display unit 8, and for controlling the operation/display unit 8 in order to display various operation conditions of the electronic appliance 1 on this operation/display unit 8.

The above-described electronic appliance 1 corresponds to a VTR and a CAM. It should be understood that since the present invention is related to the process operations of the MIC data, circuit blocks and a camera block are omitted which are employed to execute the recording/reproducing process operations of the audio/video signal.

Next, overall operation of the electronic appliance 1 shown in FIG. 5 will now be described. In the electronic appliance 1, a command transmitted from other appliances is received via the IEEE 1394 serial bus 7, this received command is processed for the above-explained physical layer and link layer, and then the processed command is sent to the digital interface microcomputer 5. The digital interface microcomputer 5 executes a preselected process operation in response to the content of this processed command, and also the present condition related to the read/write management of the MIC 3 (will be described in detail later). Also, an instruction entered from the operation/display unit 8 by the user is detected by the mode process microcomputer 9 and thereafter sent to the digital interface microcomputer 5. Then, the digital interface microcomputer 5 executes a predetermined process operation in response to the content of this instruction and the present state thereof concerning the read/write management of the MIC 3 (will be discussed in detail later).

In accordance with this embodiment mode, the digital interface microcomputer 5 employed in each of the electronic appliances owns two states, i.e., an open state and a close state as to the data read/write management of the MIC 3. Now, basic features of these two states will be explained.

In the close state, even when either a write command or a read command is received from another appliance, the own appliance returns a reject response. In the close state, when an open command is received, the own appliance is brought into the open state. In the open state, when a close command is received from another appliance under open state, the own appliance is brought into a close state.

As the open state, there are two open states, namely, a read open state and a read/write open state. Under read open state, when a read command is received from another appliance, data read from the MIC 3 through the mode process microcomputer 9 and the MIC microcomputer 4 is sent to this appliance. Under read/write open state, write data received from another appliance is written into the MIC 3 through the mode process microcomputer 9 and the MIC microcomputer 4.

Figure 6:
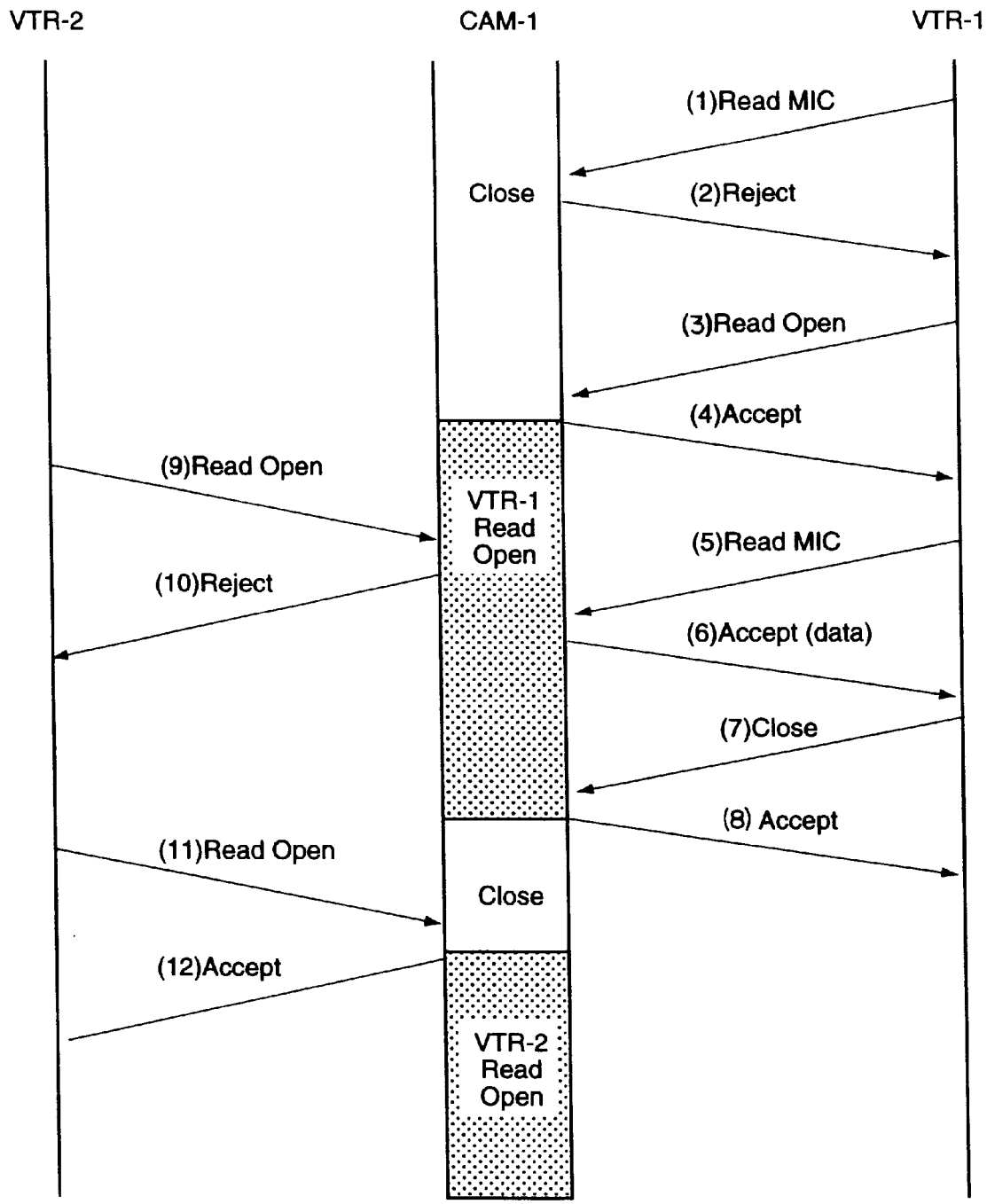
FIG. 6 is a schematic diagram for explaining one example of open/close timing of MICs employed in the electronic appliance of FIG. 5.

FIG. 6 schematically represents one example of a sequence operation for reading MIC data in the communication system to which the present invention is applied. That is, this sequence operation is such a sequence operation that the first VTR reads the MIC data stored in the first CAM.

First, the first VTR sends an MIC read command indicated as "Read MIC" to the first CAM (namely, sequence (1) of FIG. 6). Since the first CAM is under close state, the first CAM returns a reject response indicated as "Reject" to the first VTR (namely, sequence (2) in this drawing).

When the MIC read command is rejected, the first VTR subsequently sends a read open command denoted as "Read Open" to the first CAM (see sequence (3) in this drawing). The first CAM returns an accept response indicated as "Accept" to the first VTR (see sequence (4) of FIG. 6). Then, the own state of the first CAM is brought into a read open state, and this first CAM stores into a register (not shown), an ID of the first VTR corresponding to the counter appliance which has sent the read open command.

Upon receipt of the accept response in response to the above-described read command, the first VTR subsequently sends an MIC read command indicated as "Read MIC" to the first CAM (see sequence (5) of FIG. 5). At this time, since the first CAM is under open condition, the data denoted as "Accept (data)" read out from the MIC is transmitted to the first VTR (see sequence (6) of FIG. 5).

When the reading operation of the desired data is accomplished by repeating the above-described sequence operations (5) and (6), the first VTR sends a close command indicated as "Close" to the first CAM (see sequence (7) of FIG. 6). Then, the first CAM returns an accept response indicated as "Accept" to the first VTR (see sequence (8) of FIG. 6). Accordingly, the own state of the first CAM is brought into the close state, and the ID of the first VTR is erased from the register of this first CAM.

At this time, even when while the first VTR reads out the data, the second VTR sends a read open command indicated as "Read Open" to the first CAM, this first CAM rejects this read open command (see sequences (9) and (10) in FIG. 6). As a consequence, while the first VTR reads out the data, the second VTR cannot read the data. The second VTR may accept an accept response in response to the read open command after the first VTR has completed the data reading operation and sends a close command, and then the first CAM which receives this close command is brought into close condition (see sequences (11) and (12) in this figure).

If the communication system is so arranged that the first CAM can give an open permission to a plurality of electronic appliances, then when the read open command is accepted from the second VTR by the first CAM while the first VTR reads the data, this first CAM may return the accept response to the second VTR. This is because no content of the MIC data is changed by the access operation by the second VTR. If the read open command is again received from the first VTR while the first VTR reads the data, then the first CAM returns the accept response.

The above description is made of the operations such that when the first CAM is brought into the read open state from the first VTR, this first CAM receives the read open command issued from the second VTR. Now, various operations predictable in the communication system when the MIC data of the first CAM is read/written will be described as follows:

In this embodiment, the following description is constituted by a process operation when an open command is received, and another process operation when emergency measures are taken. Also, each of the above-described two process operations is subdivided into two cases, depending on such a fact as to whether the present state related to the MIC read/write management in the first CAM is under open read condition, or under read/write open condition. Furthermore, the following description is established based on such an assumption that the first VTR causes the above-described conditions of the first CAM.

[A] PROCESS OPERATION UPON RECEIPT OF OPEN COMMAND

FIG. 7 illustratively shows a process operation upon receipt of an open command. The contents of this drawing will be successively explained.

(1) PRESENT STATE IS UNDER OPEN STATE

1): When a read open command is received from the second VTR, as previously explained, the first CAM returns a reject response to the second VTR, or returns a plurality of accept responses, the number of which is equal to the quantity allowable by this first CAM.

2): When a read/write open command is received from the second VTR, this first CAM returns an accept response to the second VTR and also forcibly closes the first VTR under read open state. In other words, the first CAM recognizes that the read/write open command owns a top priority, rather than the read open command.

3): In the case that the first CAM is brought into the read open state by manipulating the main body of this first CAM (for example, data search and photo search), the operation of this CAM main body is performed. In this case, since no change is made in the MIC data, the first VTR may remain under read open state, or may be forcibly closed. In other words, the read open state caused by manipulating the main body of the first CAM owns a top priority, as compared with the read open state instructed via the data bus.

4): When the first CAM is brought into the read/write state by manipulating the main body of this first CAM (for example, recording of audio/video signal), the operation of this main body is executed, and also the read open state of the first VTR is forcibly closed.

(2) PRESENT STATE IS UNDER READ/WRITE OPEN STATE

1): When a read open command is received from the second VTR, the first CAM returns a reject response to this second VTR. In other words, the first CAM recognizes that the read/write open command owns a top priority, rather than the read open command.

2): When a read/write command is received from the second VTR, the first CAM returns a reject response. If a read/write command is received from the first VTR, the first CAM returns an accept response to this first VTR.

3): When the first CAM is brought into a read open state by manipulating the main body of this first CAM (for instance, date search and photo search), the first CAM neglects the manipulation of the main body and displays that it could not be executed so as to notify this fact to the user.

4): When the first CAM is brought into a read/write open state by manipulating the main body of this first CAM (for instance, recording of audio/video signal), the first CAM neglects the manipulation of the main body and displays that it could not be executed so as to notify this fact to the user. Otherwise, the information to be rewritten by manipulating the main body is temporarily stored, and then the stored information is written into the MIC after a close command issued from the first VTR is received, or the read/write open state is closed due to time out. It should be understood that when the first CAM is forcibly closed due to time out, after the data saved in the MIC is once erased, the stored information is written.

[B] PROCESS OPERATION FOR EMERGENCY MEASURES

FIG. 8 illustrates a process operation when emergency measures are taken. Now, this illustration will be successively described.

(1) PRESENT STATE IS UNDER READ OPEN

1): In the case that the bus resetting operation happens to occur due to the following reasons, since there is a certain possibility that the arrangement of this communication system is changed, the read open state of the first VTR is forcibly closed. That is, the data bus is reset when a cable is connected/disconnected, another electronic appliance is newly added to this communication system, the presently connected electronic appliance is removed from the communication system, or the power supply of the electronic appliance presently connected to the communication system is turned ON/OFF.

2): In such a case that after the first VTR has finally accessed to the MIC, the first CAM is not once accessed even when a predetermined time-out time period has elapsed, when an open command (either read open command or read/write open command) is received from the second VTR, this first CAM returns an accept response to the second VTR, and also forcibly closes the read open state of the first VTR.

3): In such a case that a command is received from the second VTR and this command may give influences to the data stored in the MIC (for example, eject, recording, turning OFF of power supply, etc), the first CAM returns a reject response to the second VTR, or forcibly closes the read open state of the first VTR, and then executes this received command.

4): In the case that such a main body manipulation (for example, eject, recording, turning OFF of power supply, etc) which may give influences to the data saved in the MIC is inputted, the first CAM executes this main body manipulation with a top priority, and also forcibly closes the read open state of the first VTR.

(2) PRESENT STATE IS UNDER READ/WRITE OPEN STATE

1): In the case that the bus resetting operation happens to occur due to the following reasons, since there is a certain possibility that the arrangement of this communication system is changed, the read/write open state of the first VTR is forcibly closed. That is, the data bus is reset when a cable is connected/disconnected, another electronic appliance is newly added to this communication system, the presently connected electronic appliance is removed from the communication system, or the power supply of the electronic appliance presently connected to the communication system is turned ON/OFF. At this time, if the data is being written into the MIC, then all of the data saved in the MIC are erased, because all of these MIC data could not have reliability.

The first CAM saves the ID of the first VTR corresponding to the counter electronic appliance under read/write open state even during the bus resetting operation, and will process a read/write open command sent from the first VTR with having a top priority when the initialization of the communication system is ended after the bus resetting operation, and the first CAM is brought into a condition capable of transmitting/receiving a command.

As a consequence, even when the bus resetting operation happens to occur due to the connection/disconnection of the cable while the content information such as the title is being written via the bus into the MIC, the writing process can be continued since such an electronic appliance which has accessed to the MIC before the bus resetting operation can access to the MIC with a top priority after the bus resetting operation.

2): In such a case that after the first VTR has finally accessed to the MIC, the first CAM is not once accessed even when a predetermined time-out time has elapsed, when an open command (either read open command or read/write open command) is received from the second VTR, this first CAM returns an accept response to the second VTR, and also forcibly closes the read/write open state of the first VTR.

3): In such a case that a command is received from the second VTR and this command may give influences to the data stored in the MIC (for example, eject, recording, turning OFF of power supply, etc), the first CAM returns a reject response to the second VTR.

4): When such a main body operation capable of giving influences to the data stored in the MIC (for example, eject, recording, turning OFF of power supply, etc) is inputted, the first CAM neglects the manipulation of the main body and displays that it could not be executed so as to notify this fact to the user. Otherwise, the information to be rewritten by manipulating the main body is temporarily stored, and then the stored information is written into the MIC after a close command issued from the first VTR is received, or the read/write open state is closed due to time out. It should be understood that when the first CAM is forcibly closed due to time out, after the data saved in the MIC is once erased, the stored information is written.

It should be understood that the present invention is not limited to the above-described embodiment modes, but may be modified, changed, or substituted without departing from the technical scope and spirit of the present invention.

For instance, the above-described embodiment modes are related to the various operations when the read open command, or the read/write open command is transmitted to the first CAM. The present inventive idea may be similarly applied to such an operation when the read open command, or the read/write open command is sent to the first VTR or the second VTR.

While the present invention has been described in detail, the communication system can assure that only the electronic appliance allowed for the open state reads/writes the data stored in the storage element built in the recording medium as the correct value.

Even when the bus resetting operation happens to occur while the content information (for example, title) of the information signal recorded in the recording medium via the bus is being written into the storage element, since the electronic appliance which has accessed to the storage element before the resetting operation happens to occur can be accessed with a top priority, the writing process can be continued.

Furthermore, even when there is such an electronic appliance which accesses to the storage element after being brought into the open state and is not brought into the close state for a long time period even after the process operation is completed, other electronic appliances can be brought into the open states after the time out has occurred. At this time, although the electronic appliance which has already been brought into the open state is forcibly closed, this electronic appliance may be accessed even during the time out until other electronic appliances are opened. If this electronic appliance is accessed, then the time out time period is prolonged.

What is claimed is:

1. An electronic appliance managing method used in a communication system for establishing communications among a plurality of electronic appliances connected to each other via a communication control bus capable of transmitting a control signal and an information signal in a mixed manner, in order to manage data read/write operations with respect to a storage element built in a recording medium employed in one of said plural electronic appliances, wherein: when various sorts of commands are received which are transmitted when other electronic appliances employed in said communication system perform data read/write operations to said storage element, the below-mentioned items (1) to (5) are managed:

(1) a first electronic appliance is brought into an open state by accepting an open command while being under a close condition;

(2) said first electronic appliance is maintained in a close state by accepting a close command while being under close condition;

(3) said first electronic appliance memorizes the identity of a second electronic appliance which has transmitted an open command when in an open condition;

(4) when said first electronic appliance accepts a read/write open command from a third electronic appliance other than said memorized second electronic appliance when under a read open condition, said first electronic appliance forcibly closes the read open condition; and (5) when said first electronic appliance receives one of a read open command and a read/write open command from said third electronic appliance other than said memorized second electronic appliance when under a read/write open condition, said first electronic appliance returns a reject response to said third electronic appliance issuing said read/write open command.

2. The electronic appliance managing method as claimed in claim 1 wherein:

when the communication control bus is reset under an open condition, or when a main body of said first electronic appliance is manipulated which will influence the data stored in the storage element, the open condition of said first electronic appliance is forcibly brought into a close condition.

3. The electronic appliance managing method as claimed in claim 1 wherein:

when the communication control bus is reset while said first appliance is writing data into the storage element, the state of said first electronic appliance is forcibly brought into a close state, and said first electronic appliance which has written the data into the storage element is brought into an open state with a top priority during a predetermined time period after said resetting operation.

4. The electronic appliance managing method as claimed in claim 1 wherein:

a time definition is made when said first electronic appliance is in the open state.

5. An electronic appliance used in a communication system for establishing communications among a plurality of electronic appliances connected to each other via a communication control bus capable of transmitting a control signal and an information signal in a mixed manner, wherein:

a recording medium capable of recording therein said information signal and containing a storage element for storing content information of said information signal and said electronic appliance is comprised of a controller for managing the below-mentioned items (1) to (5) when one electronic appliance receives various sorts of commands transmitted when another electronic appliance employed in said communication system executes data read/write operations to said storage element;

(1) a first electronic appliance is brought into an open state by accepting an open command while being under a close condition;

(2) said first electronic appliance is maintained in a close state by accepting a close command while being under close condition;

(3) said first electronic appliance memorizes the identity of a second electronic appliance which has transmitted an open command when in an open condition;

(4) when said first electronic appliance accepts a read/write open command from a third electronic appliance other than said memorized second electronic appliance when under a read open condition, said first electronic appliance forcibly closes the read open condition; and (5) when said first electronic appliance receives one of a read open command and a read/write open command from said third electronic appliance other than said memorized second electronic appliance when under a read/write open condition, said first electronic appliance returns a reject response to said third electronic appliance issuing said read/write open command.

6. The electronic appliance as claimed in claim 5, wherein:

when the communication control bus is reset under an open condition, or when a main body of said first electronic appliance is manipulated which will influence the data stored in the storage element, the open condition of said first electronic appliance is forcibly brought into a close condition.

7. The electronic appliance as claimed in claim 5 wherein:

when the communication control bus is reset while said first appliance is writing data into the storage element, the state of said first electronic appliance is forcibly brought into a close state, and said first electronic appliance which has written the data into the storage element is brought into an open state with a top priority during a predetermined time period after said resetting operation.

8. The electronic appliance as claimed in claim 5, wherein:

a time definition is made when said first electronic appliance is in the open state.

9. An electronic appliance used in a communication system for establishing communications among a plurality of electronic appliances connected to each other via a communication means capable of transmitting a control signal and an information signal in a mixed manner, including:

a recording means capable of recording therein said information signal and containing a storage means for storing content information of said information signal, and wherein said electronic appliance is comprised of a means for managing the below-mentioned items (1) to (5) when one electronic appliance receives various sorts of commands transmitted when another electronic appliance employed in said communication system executes data read/write operations to said storage means;

(1) a first electronic appliance is brought into an open state by accepting an open command while being under a close condition;

(2) said first electronic appliance is maintained in a close state by accepting a close command while being under close condition;

(3) said first electronic appliance memorizes the identity of a second electronic appliance which has transmitted an open command when in an open condition;

(4) said first electronic appliance accepts a read/write open command from a third electronic appliance other than said memorized second electronic appliance when under a read open condition, so that said first electronic appliance forcibly closes the read open condition; and (5) said first electronic appliance receives one of a read open command and a read/write open command from said third electronic appliance other than said memorized second electronic appliance when under a read/write open condition, so that said first electronic appliance returns a reject response to said third electronic appliance issuing said read/write open command.

10. The electronic appliance as claimed in claim 9, wherein:

when the communication means is reset under an open condition, or when a main body of said first electronic appliance is manipulated which will influence the data stored in the storage means, the open condition of said first electronic appliance is forcibly brought into a close condition.

11. The electronic appliance as claimed in claim 9 wherein:

when the communication means is reset while said first appliance is writing data into the storage means, the state of said first electronic appliance is forcibly brought into a close state, and said first electronic appliance which has written the data into the storage means is brought into an open state with a top priority during a predetermined time period after said resetting operation.

12. The electronic appliance as claimed in claim 9, wherein:

a time definition is made when said first electronic appliance is in the open state.

* * * * *